June 2, 1970        J. A. CARLSON        3,515,263
FISHING ROD CONTAINER
Original Filed March 13, 1967
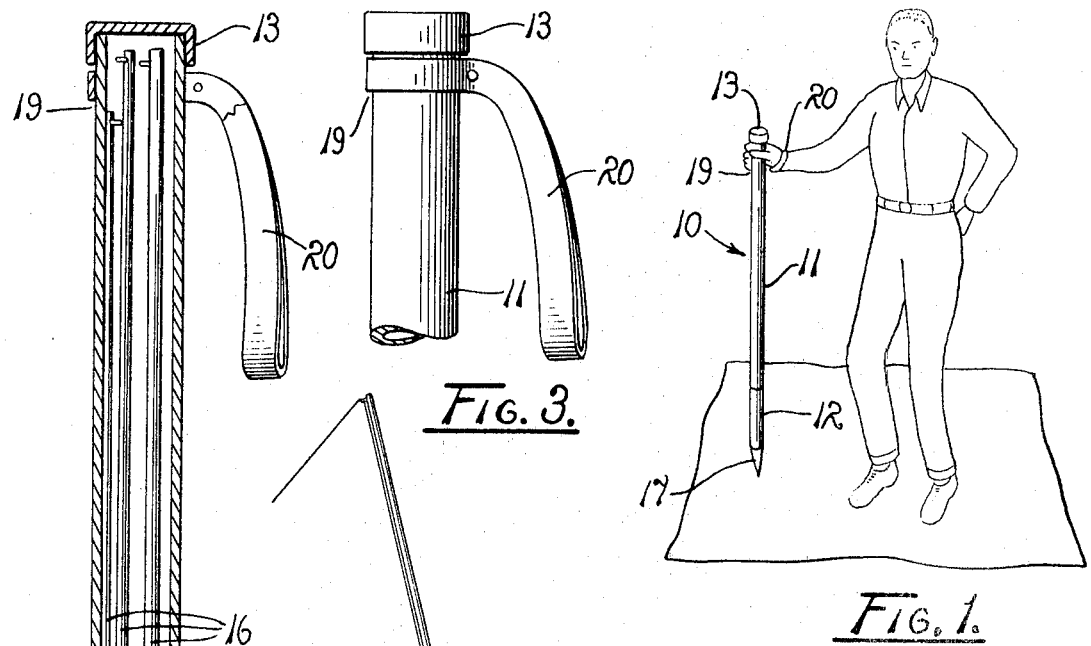
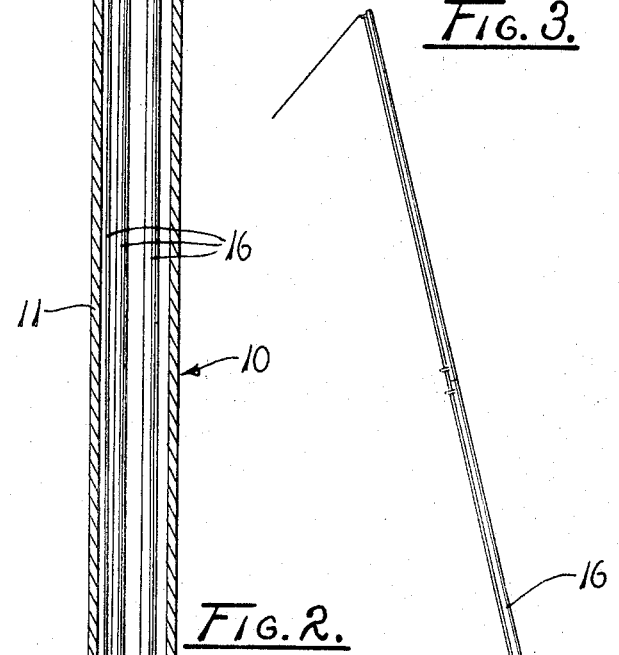
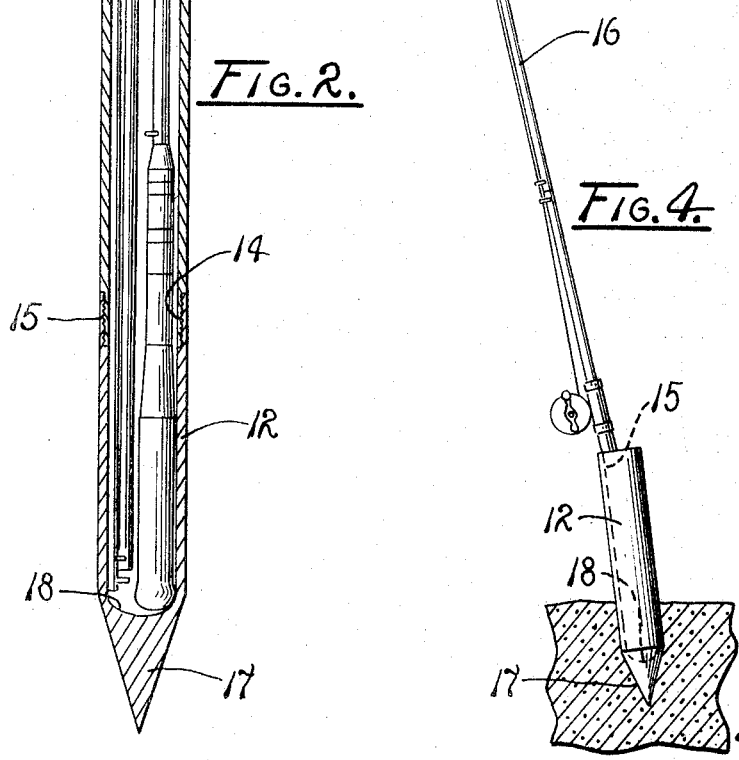
JOEL A. CARLSON
INVENTOR
ATTORNEY United States Patent Office 3,515,263
Patented June 2, 1970

3,515,263
FISHING ROD CONTAINER
Joel A. Carlson, 4527 E. Grant,
Fresno, Calif. 93702
Substitute for abandoned application Ser. No. 622,800, Mar. 13, 1967. This application Feb. 24, 1969, Ser. No. 831,795
Claims priority, application Canada, July 12, 1968, 25,063
Int. Cl. A01k 97/08, 97/10; B65d 85/54
U.S. Cl. 206—16                                    6 Claims

ABSTRACT OF THE DISCLOSURE

This invention discloses a fishing rod container which serves also as a walking aid and a fishing rod support. The container has a pointed lower end and a hand grip at the upper end. It divides into two sections to permit insertion of a disassembled fishing rod at such a point that the section with the pointed end can be inserted into the ground and used as a fishing rod support during fishing.

---

This invention relates generally to fishing tackle and more particularly to fishing rod containers.

Sportsmen have for many years utilized containers to house their fishing rods for protection and convenience during transport. In travel over rough terrain, however, these cases often constitute a considerable handicap. To eliminate this disadvantage and turn the container to a useful purpose, fishing rod containers have been developed which serve as a walking aid as well as a rod container. Such containers have not achieved wide use, however, since those developed were not sufficiently versatile or were too complex and expensive, or were otherwise ill-fitted for the purpose for which they are designed.

A need therefore exists for a fishing pole container which lends itself well to use as a walking aid and yet is inexpensive to construct and simple to use.

It is therefore a major object of this invention to provide a structurally simple, inexpensive fishing rod container which serves as well as a walking aid.

It is also an object of this invention to provide a container of the type described which, in addition, is convertible into a fishing rod support for use while fishing.

It is another object of this invention to provide a container of the type described which is usable with the great majority of presently popular fishing rods.

It is a further object of this invention to provide a container of the type described which adequately protects the fishing rod from damage during transport and is substantially moisture proof and dirt proof.

It is still another object of this invention to provide a container of the type described which is susceptible to inexpensive manufacture from light weight metal or plastic.

These and other objects and advantages of this invention will become readily apparent from the following detailed description of a preferred embodiment of the invention illustrated by the accompanying drawing, in which:

FIG. 1 is an elevational view of the preferred embodiment, showing the invention in use as a walking aid;

FIG. 2 is a sectional elevational view of the preferred embodiment showing a disassembled fishing rod therein;

FIG. 3 is a fragmentary elevational view of the preferred embodiment showing the gripping end and hand strap; and FIG. 4 is an elevational view of a portion of the container showing its use as a fishing rod support.

Referring now to the drawings and particularly FIGS. 1 and 2, the numeral 10 designates generally my improved fishing rod container. The container 10 comprises an upper section 11 and a lower section 12 which are threadedly engageable to form the container. The upper section 11 is an elongated hollow tube formed of durable rigid material, relatively lightweight material such as aluminum, or certain plastics. At its upper end section 11 has a cap 13 formed integrally with the tubular section to provide a closure. At its lower end, section 11 has external threads 14 which are disposed to engage internal threads 15 on the lower section 12 when the upper section 11 and lower section 12 are threadedly engaged as aforesaid.

The internal diameter of the tubular upper section 11 is sufficiently large to receive the parts of most popular fishing rods 16 when disassembled.

The lower section 12 of the container 10 is also tubular, and has substantially the same internal diameter as the upper section 11. The lower section 12, however, is much shorter than the upper section 11 and is tapered to a point at its lower end 17. At its upper end, the lower section 12 threaded with internal threads 15 which engage the external threads 14 of the upper section 11 wherein the sections are joined, as aforesaid, to make the complete case.

At its lower end 17 the lower section 12 is solid, the bore of the tubular portion being terminated prior thereto with a bottom 18 contoured to conveniently receive and support the butt ends of the parts of the disassembled fishing rod 16.

The lower section 12 is just long enough to supportingly engage the grip handle of the fishing rod 16 when the butt end of the handle is inserted in the open end of this section (see FIG. 4). With the pointed end 17 of section 12 wedged in sand or soft dirt, the fishing pole 16 can be supported in the lower section 12 by insertion of the butt end of the pole as aforesaid, with the reel still free to operate, thus providing a convenient rod support during fishing.

In operation, the fishing rod container 10 is first disassembled by threadedly disengaging lower section 12 from upper section 11. Next the parts of the disassembled fishing rod 16 are inserted, tip end first, into upper section 11 with the butt ends of the fishing rod parts protruding therefrom. Lower section 12 is then slipped over the butt ends of the fishing rod parts and threadedly engaged with upper section 11 to secure the two sections together with the disassembled fishing rod contained therein. A fishing rod is thus protected from excessive dirt, moisture or damage from misuse and can be conveniently carried.

To assist in the carrying of the rod and container, and enhance its use as a walking aid, a hand grip area 19 is provided at the upper end of the upper section 11, adjacent the cap 13, and a hand strap 20 is secured thereto, through which the user's wrist may be inserted for purposes of attaching the user's hand to the upper end of the container 10. Held in this position, the container 10 serves as a walking stick with the pointed end 17 engaging the ground and a rigid container providing support for the user.

When the user desires to remove and utilize the fishing rod, the container 10 is disassembled by threadedly disengaging lower section 12 from upper section 11 and the rod 16 is removed and assembled for use.

If the user desires to support his rod during the fishing, he forces the pointed end 17 of lower section 12 into sand or soft dirt and inserts the butt end of his pole into the open end of this section until it engages the bottom 18 and permits it to rest against the sides of the lower section for support as aforesaid (see FIG. 4).

Should difficulties arise in inserting the pointed end 17 into the sand or dirt because of its compaction, substantial additional force can be exerted on the lower end 17 by reassembly of the container 10 and the application of the user's full body weight and strength to upper section 11.

From this detailed description of a preferred embodiment of my invention it will be appreciated that it is fully capable of achieving the objects and providing the advantages heretofore attributed to it.

I claim:

1. A fishing rod container comprising:

an elongated, substantially rigid, tubular member, closed at each end thereof and tapered to a point at one end thereof, said tubular member having a cavity of sufficient length and diameter to receive and contain a disassembled fishing rod; and means defining an access port in said tubular member for selectively opening and closing said cavity for insertion and removable of said disassembled fishing rod, said access port being disposed at a distance from the tapered end of said tubular member substantially equal to the length of the handle of said fishing rod between its butt end and the reel mounting.

2. A fishing rod container of the type described in claim 1 in which said access port includes means for selectively separating and joining portions of said tubular member on opposite sides thereof.

3. A fishing rod container of the type described in claim 1 which includes hand gripping means operatively associated with said tubular member adjacent the end opposite the tapered end.

4. A fishing rod container comprising:

a first elongated, substantially rigid tubular member having an open end and a closed end, and an internal diameter sufficient to receive the disassembled parts of a fishing rod;

first closure means disposed on said first tubular member in closing relationship with said closed end thereof;

a second elongated, substantially rigid, tubular member having an open end and a closed end, and an internal diameter sufficient to receive the disassembled parts of a fishing rod, said second tubular member being substantially shorter in length than said first tubular member;

second closure means disposed on said second tubular member in closing relationship with the closed end thereof, said second closure means being tapered to form a point at the distal end thereof;

a bottom in said second tubular means adjacent the closed end thereof and disposed to supportingly engage the butt end of a fishing rod inserted in said second tubular member and extending out of the open end thereof in such a position that a reel on said fishing rod is disposed outboard of the open end of said second tubular members and connector means on the open ends of said first and second tubular sections and interconnecting said members.

5. A fishing rod container as described in claim 4 in which said first tubular closure member has hand grip means, including a hand strap disposed adjacent the closed end thereof.

6. A fishing rod container as described in claim 4 in which said connector means includes external threads adjacent the open end of said first tubular member and mating internal threads on the open end of said second tubular member disposed to threadingly engage said first tubular member threads and thereby interconnect said first and second tubular members.

References Cited

UNITED STATES PATENTS

| | | | |
|---|---|---|---|
| 1,577,612 | 3/1926 | Dees | 248—37 |
| 1,961,099 | 5/1934 | Dickson | 280—11.37 |
| 2,839,865 | 6/1958 | Lubanski | 43—26 |
| 3,225,734 | 12/1965 | Bule | 248—156 |

WILLIAM T. DIXON, Jr., Primary Examiner

U.S. Cl. X.R.

43—21.2, 26; 220—18